United States Patent [19]

Chen et al.

[11] Patent Number: 5,296,948
[45] Date of Patent: Mar. 22, 1994

[54] HOLOGRAM LIGHT BOX

[76] Inventors: Alexander C. T. Chen, No. 25, Sec. 2, Ho Ping W. Rd., Taipei, Taiwan; Francis C. S. Fong, Room 910, 9/F., Tower A, Hunghom Commercial Centre, 37-39, Ma Tau Wai Rd., Kowloon, Hong Kong

[21] Appl. No.: 2,216

[22] Filed: Jan. 8, 1993

[51] Int. Cl.$^5$ .......................... G03H 1/24; G03H 1/02
[52] U.S. Cl. ........................................ 359/1; 359/32; 362/137
[58] Field of Search .................. 359/1, 22, 32, 33, 35; 362/136, 137

[56] References Cited

U.S. PATENT DOCUMENTS

| | | | |
|---|---|---|---|
| 4,390,234 | 6/1983 | Embach | 359/32 |
| 4,623,215 | 11/1986 | Bazargan | 359/32 |
| 4,807,971 | 2/1989 | Nurano | 359/32 |
| 4,830,445 | 5/1989 | Robinson | 359/32 |
| 5,121,229 | 6/1992 | Benton et al. | 359/32 |
| 5,142,384 | 8/1992 | Wood et al. | 359/1 |

Primary Examiner—Martin Lerner
Attorney, Agent, or Firm—Luke Santangelo

[57] ABSTRACT

A light box includes a lower casing and an upper casing pivotally connected to the lower casing. A lighting element is pivotally mounted to the inner side of the lower casing. A plurality of pairs of spaced ridges are provided on both longitudinal sides of the inner periphery of the lower casing. A plate is pivotally received in the inner side of the upper casing at an upper side thereof. The lower side of the plate is selectively supported by one of the pairs of the ridges. A hologram is provided on one side of the plate which faces the lighting element. When the upper casing is opened to a predetermined extent, the lighting element is switched on. Under adjustment of the inclination of the hologram plate and the lighting element, a viewer may appreciate various images contained in the hologram.

7 Claims, 3 Drawing Sheets

HOLOGRAM LIGHT BOX

BACKGROUND OF THE INVENTION

The present invention relates to a hologram light box and, more particularly, to a hologram light box in which a hologram is stored and displayed.

As well known, a hologram is a medium which enables the storage of three-dimensional visual information, usually multiple images, on a two-dimensional plane, such that a change in the light source will cause a change in the image seen by a viewer. The hologram can be, in mass production, reprinted on transparent plastic material or similar articles. Also known is that a change in the incident angle of the light source provides a great diversity of images and color changing to a viewer.

There is, however, limitation in displaying the three-dimensional image stored in the hologram as lacking associated devices. Therefore, holograms are usually displayed in a hand-held manner, which tends to damage the holograms.

Therefore, there has been a long and unfulfilled need for a device for displaying and storing holograms.

SUMMARY OF THE INVENTION

The present invention provides a hologram light box which includes a lower casing and an upper casing pivotally connected to the lower casing.

A lighting element is pivotally mounted to the inner side of the lower casing. A plurality of pairs of spaced ridges are provided on both longitudinal sides of the inner periphery of the lower casing. A plate is pivotally received in the inner side of the upper casing at an upper side thereof. The lower side of the plate is selectively supported by one of the pairs of the ridges. A hologram is provided on one side of the plate which faces the lighting element.

When the upper casing is opened to a pre-determined extent, the lighting element is switched on. Under adjustment of the inclination of the hologram plate and the lighting element, a viewer may appreciate various images contained in the hologram (the color of the images also varies). Preferably, the hologram is changeable so as to provide more selection for the viewer.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
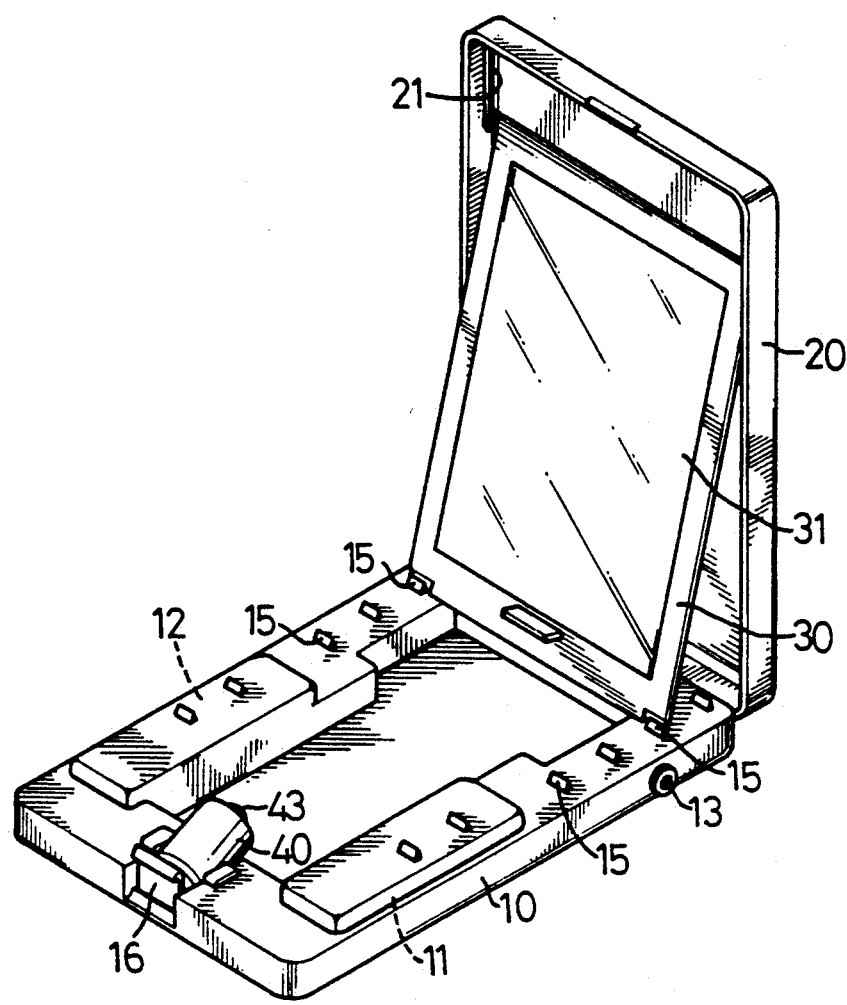
FIG. 1 is a perspective view of a hologram light box in accordance with the present invention.
Figure 2:
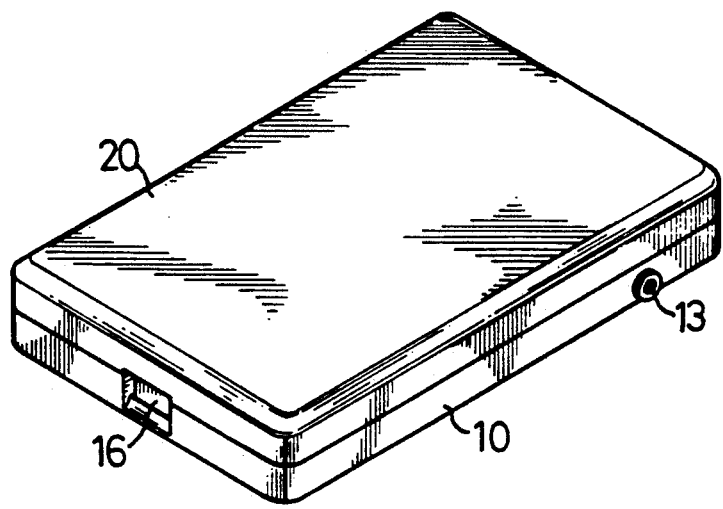
FIG. 2 is a perspective view of the hologram light box in a closed position.
Figure 3:
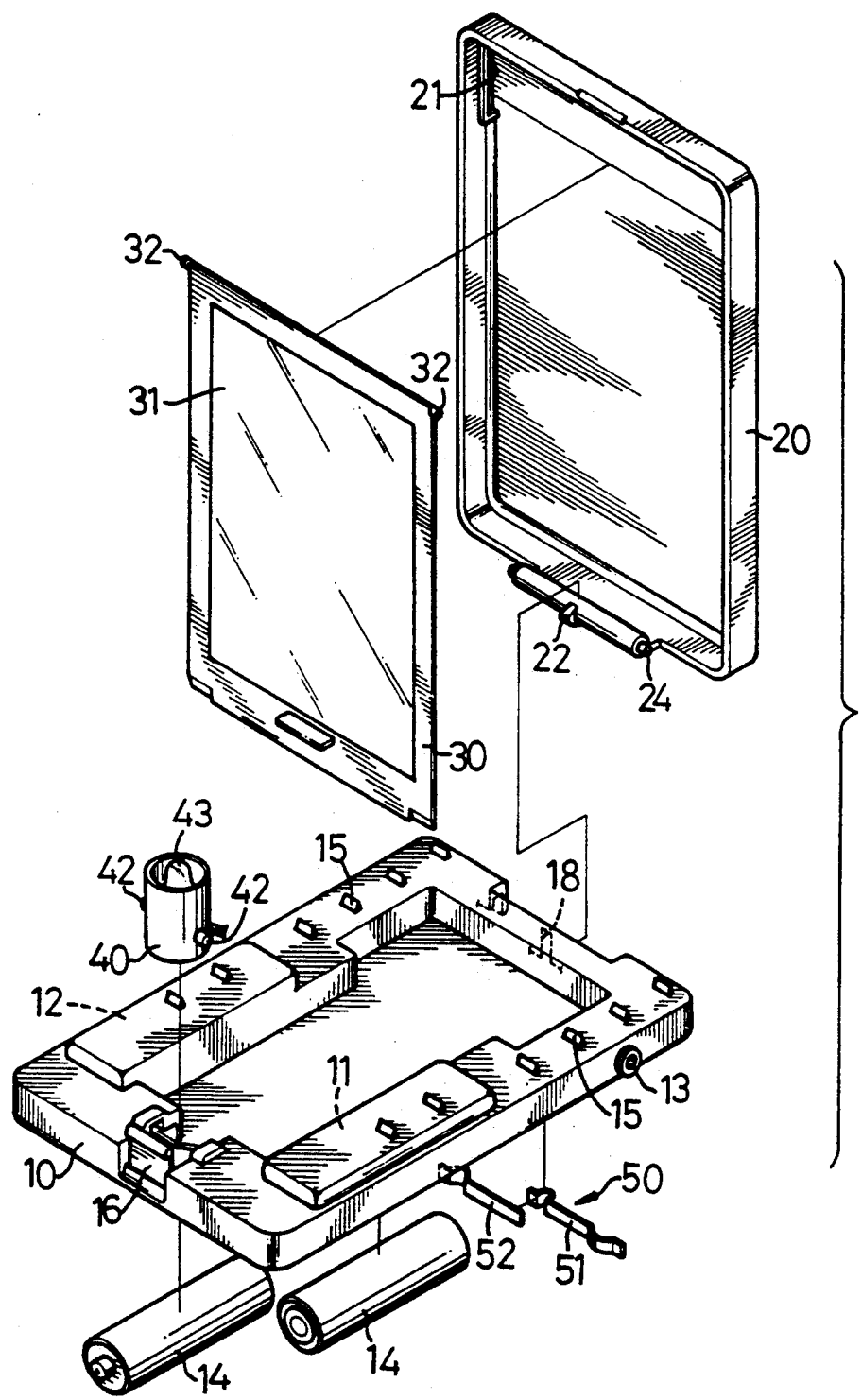
FIG. 3 is an exploded view of the hologram light box.

Referring to the drawings and initially to FIGS. 1 through 3, a hologram light box in accordance with the present invention generally includes a lower casing 10 and an upper casing 20 pivotally connected to the lower casing 10. A snap fastener 16 is provided on the lower casing 10 so as to provide a releasable snapping engagement relationship with the upper casing 20.

Two battery compartments 11 and 12, which are accessible from the underside of the lower casing 10, are provided to receive batteries 14 which provide electricity to a lighting element. The lighting element is substantially a cylindrical housing 40 in which a bulb 43 is mounted. Provided on both sides of the cylindrical housing 40 is a pair of lugs 42 by means of which the lighting element is pivotally mounted to the inner side of the lower casing 10. A plurality of pairs of spaced ridges 15 are provided on both longitudinal sides of the inner periphery of the lower casing 10, whose function will be illustrated in the following paragraph.

Figure 4:
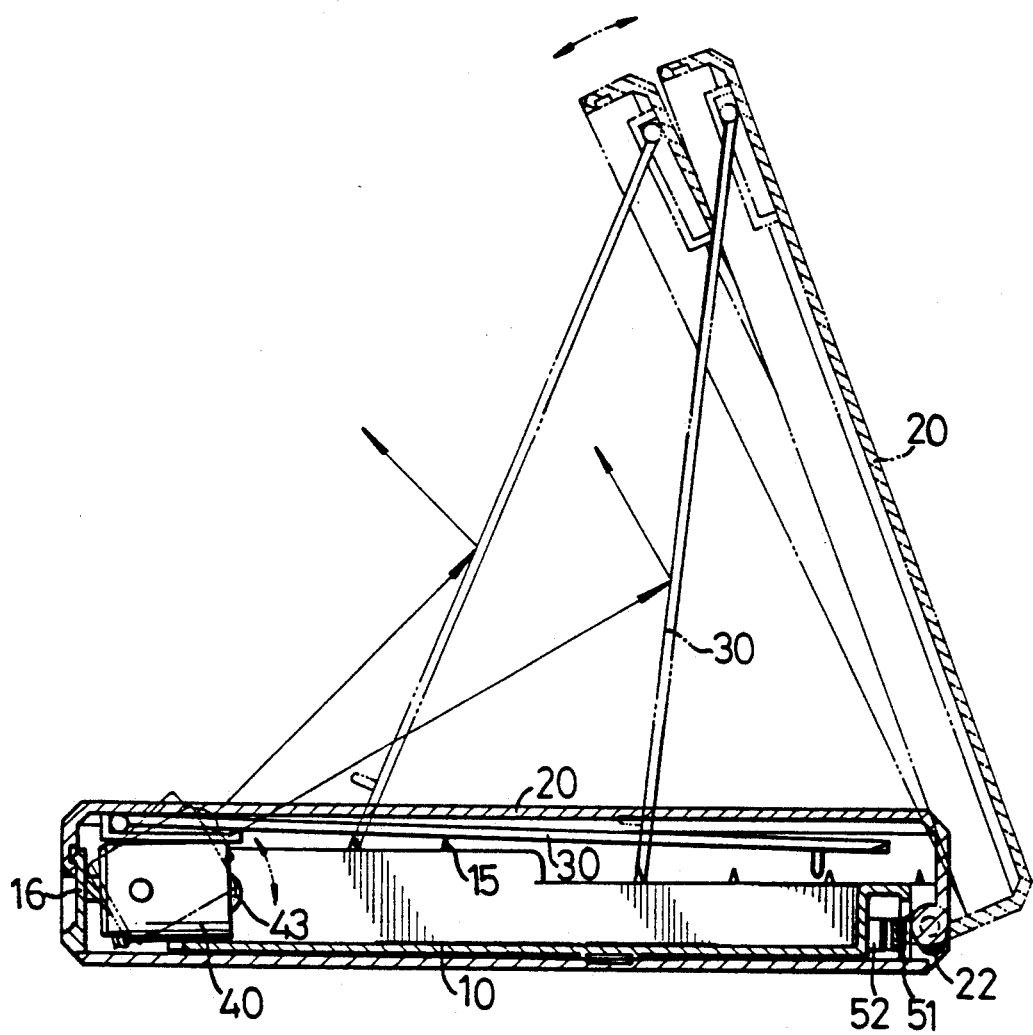
FIG. 4 is a cross-sectional view of the hologram light box, illustrating various positions thereof.

A plate 30 is pivotally received in the inner side of the upper casing 20 at an upper side thereof (see lugs 32). The lower side of the plate 30 is selectively supported by one of the pairs of the ridges 15, as shown in FIG. 4. A hologram 31 is provided on one side of the plate 30 which faces the lighting element.

Figure 5:
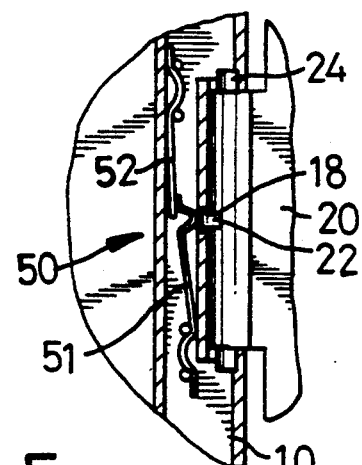
FIG. 5 is an enlarged partial fragmentary cross-sectional view illustrating the actuation of the switch.

Referring to FIG. 5, when the upper casing 20 is opened to a pre-determined extent in which an actuating member 22 on the pivotal shaft 24 passes through an opening 18 in the lower casing to cause the contact of a switch consisting of two conducting plates 51 and 52 which are mounted in the lower casing 10, thereby switching on the lighting element. The electrical connection between the lighting element, the switch, and the batteries 14 are conventional and thus will not be illustrated. When the hologram light box is closed, the lighting element is switched off. Optionally, external power source may be inputted via a socket 13 to switch on the lighting element. Furthermore, phonetic means, such as a phonetic circuit and speaker, may be provided to improve the utility during display of the hologram.

According to the above, it is clear that under adjustment of the inclination of the hologram plate 30 and the lighting element (which alters the focus), a viewer may appreciate various images contained in the hologram (the color of the images also varies). Preferably, the hologram is changeable so as to provide more selection for the viewer.

Although the invention has been explained in relation to its preferred embodiment, it is to be understood that many other possible modifications and variations can be made without departing from the spirit and scope of the invention as hereinafter claimed.

I claim:

1. A hologram light box comprising a lower casing and an upper casing pivotally connected to said lower casing, a lighting element being pivotally mounted to an inner side of said lower casing in which said lighting element is switched on when said upper casing is opened to a pre-determined extent relative to said lower casing, a plurality of pairs of spaced ridges being provided on both longitudinal sides of an inner periphery of said lower casing, a plate being pivotally received in said inner side of said upper casing at an upper side thereof, a lower side of said plate being selectively supported by one of said pairs of said ridges, and a hologram being provided on one side of said plate which faces said lighting element.

2. The hologram light box as claimed in claim 1 wherein said hologram is removably mounted on said plate.

3. The hologram light box as claimed in claim 1 wherein a snap fastener is provided on one of said lower casing and said upper casing so as to provided a releasable fastening engagement relationship therebetween.

4. The hologram light box as claimed in claim 1 wherein a battery compartment is provided in said lower casing for receiving batteries.

5. The hologram light box as claimed in claim 4 wherein said battery compartment is accessible from said underside of said lower casing.

6. The hologram light box as claimed in claim 1 wherein an actuating member is provided on said upper casing and an opening is formed in said lower casing, when said upper casing is opened to the pre-determined position, said actuating member passes through said opening to switch on said lighting element.

7. The hologram light box as claimed in claim 1 wherein a socket is provided in said lower casing such that an external power source is inputted via said socket to switch on said lighting element.

* * * * *